United States Patent
Teder et al.

[11] Patent Number: 5,828,659
[45] Date of Patent: Oct. 27, 1998

[54] TIME ALIGNMENT OF TRANSMISSION IN A DOWN-LINK OF CDMA SYSTEM

[75] Inventors: Paul Teder, Täby; Lars Gustav Larsson; Håkan Anders Persson, both of Stockholm, all of Sweden

[73] Assignee: Telefonaktiebolaget LM Ericsson, Stockholm, Sweden

[21] Appl. No.: 691,436

[22] Filed: Aug. 2, 1996

Related U.S. Application Data

[63] Continuation of Ser. No. 75,893, Jun. 14, 1993, abandoned.

[51] Int. Cl.⁶ ............................. H04J 3/06; H04J 13/00
[52] U.S. Cl. ................... 370/328; 370/342; 370/350; 370/441; 370/519; 375/356; 455/67.6
[58] Field of Search ..................... 370/503, 504, 505, 506, 507, 508, 509, 510, 511, 512, 513, 514, 515, 516, 517, 518, 519, 520, 350, 441, 342; 375/354, 356, 357, 358, 359, 362, 364, 368, 371; 455/13.2, 18, 440, 500, 502, 524, 67.1, 67.6, 69

[56] References Cited

U.S. PATENT DOCUMENTS

| | | | |
|---|---|---|---|
| 4,472,802 | 9/1984 | Pin et al. | 370/95.3 |
| 5,042,082 | 8/1991 | Dahlin | 455/33 |
| 5,128,925 | 7/1992 | Dornstetter et al. | 455/502 |
| 5,151,919 | 9/1992 | Dent | 375/1 |
| 5,164,958 | 11/1992 | Omura | 375/1 |
| 5,175,867 | 12/1992 | Wejke et al. | 455/33.1 |
| 5,179,559 | 1/1993 | Crisler et al. | 455/33.2 |
| 5,293,380 | 3/1994 | Kondo | 370/95.3 |
| 5,293,423 | 3/1994 | Dahlin et al. | 455/33.1 |
| 5,309,439 | 5/1994 | Roos | 370/95.3 |
| 5,345,467 | 9/1994 | Lomp et al. | 375/1 |
| 5,423,067 | 6/1995 | Manabe | 455/67.7 |
| 5,617,410 | 4/1997 | Matsumoto | 455/502 |

FOREIGN PATENT DOCUMENTS

| | | | |
|---|---|---|---|
| 0 335 846 | 10/1989 | European Pat. Off. | H04H 3/00 |
| 0 437 835 | 7/1991 | European Pat. Off. | H04B 7/26 |
| 0 522 772 | 1/1993 | European Pat. Off. | H04Q 7/04 |
| WO91/15061 | 10/1991 | WIPO | H04B 1/00 |

*Primary Examiner*—Huy D. Vu
*Attorney, Agent, or Firm*—Burns, Doane, Swecker & Mathis, L.L.P.

[57] ABSTRACT

A mobile station can be connected to more than one base station in a procedure known as macro-diversity. In order to synchronize the signals for a specific cellular call connection, the time difference between the connected base station's signal and a macro-diversity candidate base station's signal is measured by a mobile station. This measurement is then transmitted to the network. The measurements can be used to achieve synchronization via frame staggering.

33 Claims, 7 Drawing Sheets

Fig. 1

TIME ALIGNMENT OF TRANSMISSION IN A DOWN-LINK OF CDMA SYSTEM

This application is a continuation of application Ser. No. 08/075,893, filed Jun. 14, 1993 abandoned.

FIELD OF THE INVENTION

The present invention relates to the use of Code Division Multiple Access (CDMA) communications techniques in cellular radio telephone communication systems, and more particularly, to a method using a Direct Sequence-Code Division Multiple Access (DS-CDMA) communication technique for aligning transmissions in macro-diversity down-links from more than one base station to the same mobile station.

BACKGROUND OF THE INVENTION

CDMA or spread spectrum communications have been in existence since the days of World War II. Early applications were predominantly military oriented. However, today there has been an increasing interest in using spread spectrum systems in commercial applications. Some examples include digital cellular radio, land mobile radio, and indoor and outdoor personal communication networks, generically referred to as cellular systems herein.

Currently, channel access in cellular systems is achieved using Frequency Division Multiple Access (FDMA) and Time Division Multiple Access (IDMA) methods. In FDMA, a communication channel is a single radio frequency band into which a signal's transmission power is concentrated. Interference with adjacent channels is limited by the use of band pass filters which only pass signal energy within the specified frequency band. Thus, with each channel being assigned a different frequency, system capacity is limited by the available frequencies as well as by limitations imposed by channel reuse.

In TDMA systems, a channel consists of a time slot in a periodic train of time intervals over the same frequency. Each period of time slots is called a frame. A given signal's energy is confined to one of these time slots. Adjacent channel interference is limited by the use of a time gate or other synchronization element that only passes signal energy received at the proper time. Thus, the problem of interference from different relative signal strength levels is reduced. With FDMA or TDMA systems or hybrid FDMA/TDMA systems, the goal is to insure that two potentially interfering signals do not occupy the same frequency at the same time.

Capacity in a TDMA system is increased by compressing the transmission signal into a shorter time slot. As a result, the information must be transmitted at a correspondingly faster burst rate which increases the amount of occupied spectrum proportionally.

In present systems, such as GSM (Global System for Mobile Communication), time-alignment of mobile stations in an up-link is used to ensure that a base station receives the signal from a mobile station in the assigned TDMA time-slot. An overlap into a neighboring time-slot, caused by different propagation delays for example, would cause interference with another mobile-to-base station link.

In contrast to FDMA and TDMA, Code Division Multiple Access (CDMA) allows signals to overlap in both time and frequency. CDMA signals share the same frequency spectrum in present day systems. In the frequency or the time domain, the multiple access signals appear to be on top of each other.

In principle, in a CDMA system the informational data stream to be transmitted is impressed upon a much higher rate data stream known as a signature sequence. Typically, the signature sequence data are binary, providing a bit stream. One way to generate this signature sequence is with a pseudo-noise (PN) process that appears random, but can be replicated by an authorized receiver. The informational data stream and the high bit rate signature sequence stream are combined by multiplying the two bit streams together, assuming the binary values of the two bit streams are represented by +1 or −1. This combination of the higher bit rate signal with the lower bit rate data stream is called coding or spreading the informational data stream signal. Each informational data stream or channel is allocated a unique spreading code.

A plurality of coded information signals modulate a radio frequency carrier, for example by quadrature phase shift keying (QPSK), and are jointly received as a composite signal at a receiver. Each of the coded signals overlaps all of the other coded signals, as well as noise-related signals, in both frequency and time. If the receiver is authorized, then the composite signal is correlated with one of the unique codes, and the corresponding information signal can be isolated and decoded.

One CDMA technique, called "traditional CDMA with direct spreading", uses a signature sequence to represent one bit of information. Receiving the transmitted sequence or its complement (the transmitted binary sequence values) indicates whether the information bit is a "0" or "1". The signature sequence usually comprises N bits, and each bit is called a "chip". The entire N-chip sequence, or its complement, is referred to as a transmitted symbol. The receiver correlates the received signal with the known signature sequence of its own signature sequence generator to produce a normalized value ranging from −1 to +1. When a large positive correlation results, a "0" is detected; when a large negative correlation results, a "1" is detected.

Another CDMA technique, called "enhanced CDMA with direct spreading" allows each transmitted sequence to represent more than one bit of information. A set of code words, typically orthogonal code words or bi-orthogonal code words, is used to code a group of information bits into a much longer code sequence or code symbol. A signature sequence or scramble mask is modulo-2 added to the binary code sequence before transmission. At the receiver, the known scramble mask is used to descramble the received signal, which is then correlated to all possible code words. The code word with the largest correlation value indicates which code word was most likely sent, indicating which information bits were most likely sent. One common orthogonal code is the Walsh-Hadamard (WH) code.

In both traditional and enhanced CDMA, generically referred to as Direct Sequence-Code Division Multiple Access (DS-CDMA), the "information bits" referred to above can also be coded bits, where the code used is a block or convolutional code. One or more information bits can form a data symbol. Also, the signature sequence or scramble mask can be much longer than a single code sequence, in which case a sub-sequence of the signature sequence or scramble mask is added to the code sequence.

In a conventional cellular communication systems such as AMPS, reliable handover between base stations is viable if the carrier frequency is not changed. Handoff procedure for handing a call link from one cell to another is initiated when the cell site receiver handling the call detects that the received signal strength from a mobile station falls below a predetermined threshold value. A low signal strength indication implies that the mobile station is near a cell border. When the signal level falls below a threshold, the base station queries the system controller to determine whether a neighboring base station receives the mobile telephone signal with better signal strength than the current base station.

The system controller in response to the base station inquiry sends messages to the neighboring base stations for the handoff requests. The neighboring base stations employ scanning receivers which look for the signal of the base station on a specified channel. Should one of the neighboring base stations report an adequate signal level to the system controller, then a handoff is attempted.

A handoff is initiated when an idle channel from the new base station is selected. A control message is sent to the mobile station commanding it to switch from the current channel to a new channel. At the same time, the system controller switches the call link from the first base station to the second base station.

In some systems, such as disclosed in U.S. Pat. No. 5,101,501, the call link from the first base station is maintained for a period after initiating and establishing a call link to the second base station. This process is called soft handover through macro-diversity and reduces the perception of the handover due to loss of data during the actual handover. Macro-diversity may be implemented for reasons other than handover, e.g., in noisy environments to assure good signal quality.

In a CDMA system overlap of time-slots as in TDMA systems is not a problem since a mobile station transmits continuously, and thus does not need to synchronize to other mobile stations. However, when a mobile station is connected to more than one base station in macro-diversity, there is a need to synchronize the base stations in the down-link (also known as the forward link).

Macro-diversity in a CDMA system can be achieved with synchronized base stations. The base stations can be synchronized with all base station digital transmissions being referenced to a common CDMA system-wide time scale that uses the Global Positioning System (GPS) time scale, which is traceable to and synchronous with Universal Coordinated Time (UTC). The signals from all the base stations are transmitted at the same instant.

Figure 1:
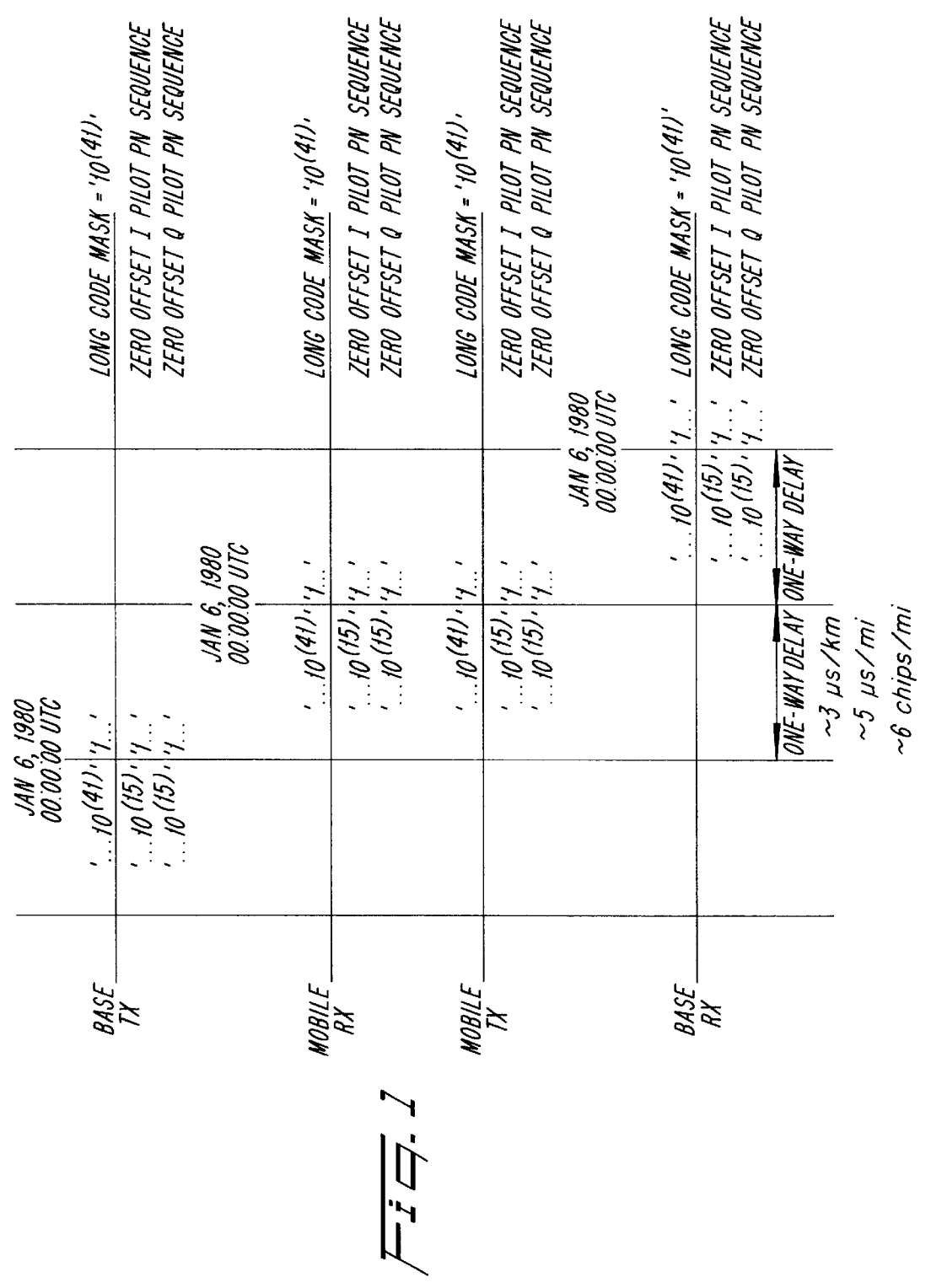

FIG. 1 shows the relation of system time at various points in the CDMA system. The system time at various points in the transmission and the reception processes is the absolute time referenced at the base station antenna offset by the one-way or round-trip delay of the transmission, as appropriate. Time measurements are referenced to the transmit and receive antennas of the base station and the radio frequency connector of the mobile station.

In order to enable macro-diversity, the base stations can be synchronized as described above through a common time reference; GPS. Therefore, the signals transmitted from the base stations are synchronized in time. However, due to different propagation delays in the links, the signals arrive at different time instants at the mobile station. Normally in CDMA systems a rake receiver is used to handle time dispersion and the macro-diversity can be seen as time dispersion from the receivers point-of-view. The principle of the rake receiver is to collect the energies from different paths and combine them before a bit-decision is made.

In unregulated environments (where the spectrum use between operators is not regulated), it is difficult to have the base stations synchronized between different operators. Also, a system that relies on a common time-reference in order to function properly will be sensitive to failures of the time reference system.

In cells with large radii, the differences in propagation delays between the base stations will become large. This would increase the complexity of the receiver in a mobile station, due to the received signal needing to be buffered for at least the time difference between the arrival of the first path from the base station with the lowest delay, and the last path from the base station with the longest delay. The span in which the signals can arrive and be properly received is called the rake window. If the signals do not fit into the rake window they will only cause additional interference. The use of time alignment commands to synchronize TDMA bursts in GSM is described in GSM 05.10.

SUMMARY OF THE INVENTION

The present invention overcomes the above mentioned problems and achieves synchronization of base stations in the down-link, on a call by call basis, when a mobile station is linked to more than one base station. The base stations may or may not be synchronized, but the present invention calls for only a specific connection or communications down-link to be synchronized, the synchronization taking into account the propagation delays of the communication paths.

In order to synchronize the signals for a specific connection, the time difference between the connected base station's signal and the macro-diversity candidate base station's signal is measured by a mobile station. This measurement is then transmitted to the network. The measurements can be used to achieve synchronization by means of frame staggering.

More specifically, the present invention achieves its synchronization between the traffic channels transmitted from different base stations to a mobile station in the following manner. The mobile station measures the difference in time delay between reception of a reference channel, e.g., a common control channel (with no frame staggering) from surrounding base stations and a reference base station. The channels from different base stations may use the same or different frequencies. The measured values are sent to a network in a measurement report. If macro-diversity is to be utilized, a new base station will be told of a time offset that should be used for the newly established call (or traffic channel) connection. The traffic channel can be arbitrarily offset relative to the control channel and other traffic channels of the individual base station. When data arrives at the base station, it is transmitted according to the specified time offset relative to control channel frames. The new signal path will be received by the mobile station within a rake window, thereby avoiding the introduction of unnecessary interference. When the mobile station moves away from the original base station with which it had a call link toward the new base station, the offset of the traffic channel can be updated on a periodic basis.

Among the advantages of the present invention are that the base stations can be unsynchronized because no base station synchronization (as opposed to call link synchronization) is needed for achieving macro-diversity. With time alignment commands, synchronized reception in the mobile station can be achieved even for large cells, which is not the case for base station synchronization. Also, the need for buffering of the signal before macro-diversity combining is greatly reduced, thereby reducing the complexity of the receiver in the mobile stations.

BRIEF DESCRIPTION OF THE DRAWINGS

The present invention will now be described with reference to the accompanying drawing figures in which:

FIG. 1 shows the relation of a system time at various points in a CDMA system;

DETAILED DESCRIPTION OF THE PREFERRED EMBODIMENTS

The present invention will now be described with reference to one possible embodiment. The description should not be construed as limitive, but merely exemplary.

The following definitions for the down-link are used herein. The "active set" is the set of base stations transmitting to a mobile station and an "active set update" ASU is when this set is modified. A handover from a first base station BS1 to a second base station BS2 means that before the handover, the active set contains only a first base station BS1 and after the handover only base station BS2 in normal situations. Macro-diversity is when more than one base station is in the active set. Macro-diversity may involve base stations transmitting on different frequencies or on the same frequency. Soft handover between two base stations means that macro-diversity between the two base stations is used during the handover, irrespective of the combining method used. Hard handover between two base stations means that macro-diversity between the two base stations is not used during the handover. Seamless handover means that the handover is not perceived by the user, and could be hard or soft handovers.

Figure 2:
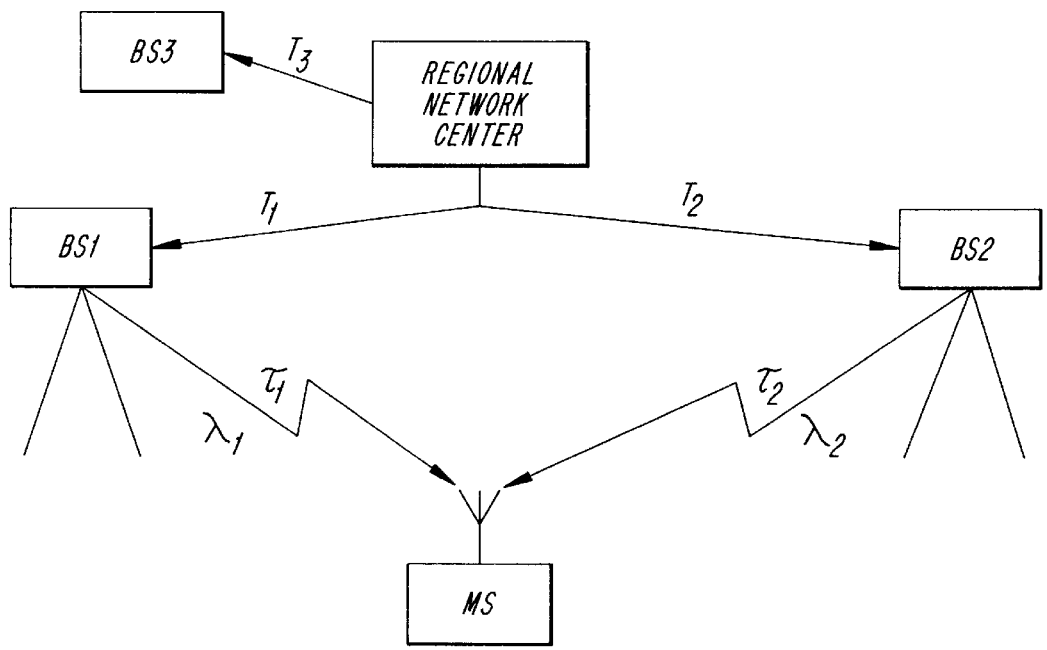
FIG. 2 illustrates communication paths in a cellular system.

An overview of signal paths in a cellular system is shown in FIG. 2 wherein $\tau 1$ is the propagation delay from a first base station BS1 to a mobile station MS and $\tau 2$ is the propagation delay from a second base station BS2 to the mobile station MS. $\lambda 1$ is a traffic channel offset relative to a control channel on the first base station BS1 and $\lambda 2$ is a traffic channel offset relative to a control channel on the second base station BS2 ( see FIG. 3). The base stations BS1, BS2 and BS3 are connected by land lines in typical existing systems to a Radio Network Controller RNC. In an actual system, there would be many base stations and a multiplicity of mobile stations. Furthermore, the network could be connected to other networks by land lines. FIG. 2 has been simplified to better emphasize the present invention.

In the cellular system, a first base station BS1 can establish a communication link with a mobile station MS. The first base station BS1, in the active set, can transmit and receive communications from various mobile stations over a plurality of communication channels. These channels are defined by the CDMA method. Among the communication channels is a control channel receivable by all mobile stations upon which broadcast overhead messages and the like are transmitted. The cellular system is designed for transmission both analog information, e.g., speech in digitized form, and pure digital information. For purposes of this application, the term communication link is used for any form of communication channel between a mobile station and a base station in the same system or another system.

When a call is initiated by a mobile station MS, the mobile station MS receives broadcast overhead messages from neighboring base stations, determines which base station has the strongest signal, and determines what channels are available from a base station having the strongest signal from the respective broadcast overhead message. If a communication channel is available, the mobile station MS initiates a communication link with a first base station BS1. For a call to a mobile station a base station can initiate a link with a mobile station MS by broadcasting the mobile stations MS mobile identification number (MIN). Once the communication link is established, it may become desirable for the mobile station MS to be linked to more than one base station in macro-diversity. In this case, the first base station BS1 transmits and receives substantially the same information to and from the mobile station MS that a second base station BS2 does. These transmitted signals are not necessarily identical, due to interference and other factors, but are substantially identical.

Macro-diversity may be used during handoff of a mobile station MS from one base station to another. This occurs when the mobile station approaches a border of a cell wherein the communication link between a first base station BS1 and the mobile station MS becomes tenuous. It therefore becomes desirable to initiate communications with a second base station BS2, preferably through Mobile Assisted Handoff (MAHO) such as disclosed in U.S. Pat. No. 5,042,082 to Dahlin. However, unlike conventional systems, the present invention provides seamless, soft handover of a communication link with the mobile station MS by establishing a communication with more than one base station, e.g., both the first and second base stations BS1 and BS2.

Once the mobile station has established communications with a second base station BS2, the initial communication link with the first base station BS1 can be dropped. Macro-diversity can be used for reasons other than handover, such as in noisy environments.

The difference in time of the received rays from the base stations can be quite large even if the base stations are synchronized to each other. This will imply that the maximum time span in the rake detection has to be increased not only to handle the time dispersion but also the delays of the signals from different base stations which can be larger, e.g., hundreds of micro seconds. In order to not employ macro-diversity when it cannot be utilized in the mobile station MS, the present invention measures the time difference of the macro-diversity candidate base station's BS2 signal and the connected base station's BS1 signal. This measure can be used to achieve synchronization with the means of frame staggering.

Because only one signal originates from the mobile station MS, and two signals originate from the base stations (one from the first base station BS1 and one from the second base station BS2), synchronization is only needed in the down-link. Macro-diversity in the up-link is not done in the rake receiver in the preferred embodiment, because signals from different base stations are combined in a radio network controller RNC. Thus, the present invention entails synchronizing the base stations in the down-link, on a call by call basis, when a mobile station is in macro-diversity. The base stations may or may not be synchronized, but the present invention relieves the necessity of base station synchronization while accommodating for propagation delay.

In order to synchronize the signals of a specific connection, the time difference between a connected base station's BS1 signal and the macro-diversity candidate base station BS2 is measured by a mobile station MS. This measurement is then transmitted back to the network. The measurements of the propagation delay can be used to stagger the frames of data thereby synchronizing the two base stations involved in the macro-diversity communications link.

The basic procedure is:

1. The MS mobile station measures the difference in time between the reception of a Control Channel (CCH) from the surrounding base stations and one reference base station (CDMA frame offset). CCH is a common control channel that is always broadcast by a base station.
2. These values are sent to the Radio Network Controller (RNC) in an ordinary measurement report.
3. If the network RNC decides that macro-diversity should be utilized, a new base station BS2 will then be told the time offset that should be used for this traffic channel connection. The traffic channel can be arbitrarily offset relative to the CCH and other traffic channels of the new base station BS2.
4. When data arrives from the network RNC, the base station BS shall transmit it on the next traffic channel frame. Thus the data is buffered, resulting in a buffering delay.
5. The new signal path will be received in the mobile station MS at about the same time instant as the old signal.
6. When the mobile station MS moves from the first base station BS1 towards the new base station BS2, the offset of the traffic channels is updated.

Figure 4:
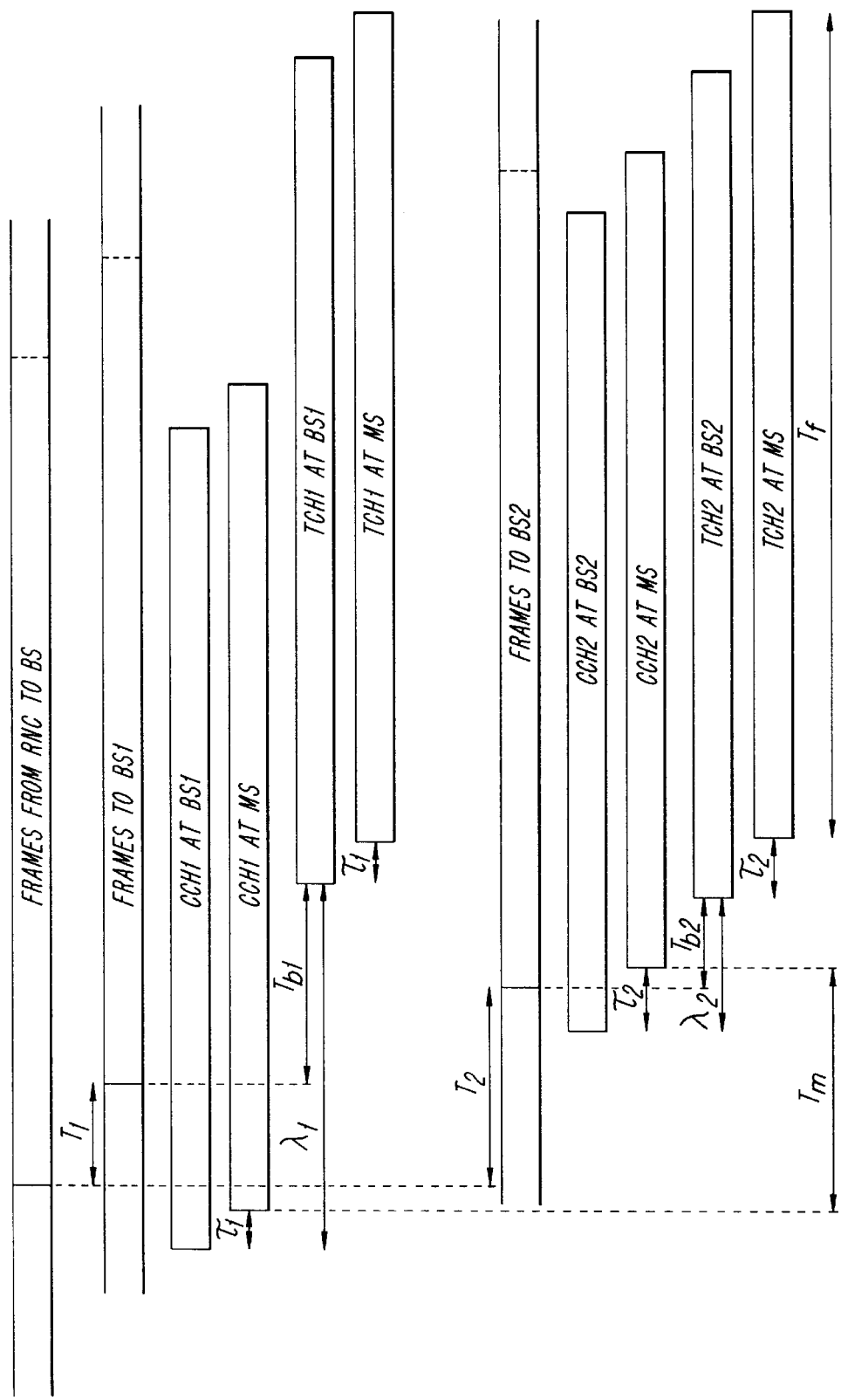
FIG. 4 is a flowchart in accordance with the present invention.

This procedure is illustrated in the flowchart of FIG. 4. In step S1, a call link is established between a first base station BS1 and a mobile station MS. When in active mode, the mobile station MS continuously measures the signal strength of neighboring base stations BS2, BS3, etc, as shown in step S2. Alternatively, the neighboring base stations BS2, BS3, etc., can measure the signal strength of the mobile station MS, however the mobile assisted handoff (MAHO) is generally preferred. These measurements are then transmitted through the base stations in the active set, here first base station BS1, to the radio network controller in step S3.

Thereafter, as shown in step S4, a call link is initiated with at least one neighboring base station BS2, preferably the base station having the strongest signal strength and an available channel. The call link can be initiated with the second base station BS2 forming a communication link with the mobile station MS by broadcasting on the same channel as the call link with the first base station BS1, for instance. The first and second base stations BS1 and BS2 can transmit on the same or different frequencies, whichever is advantageous. As shown in step S5, the mobile station MS measures the difference in time delay between the reception of a channel with no frame staggering (e.g., a common control channel) from surrounding base stations and a reference base station. These values are sent to a network in a measurement report in step S3. If macro-diversity is to be utilized, a new base station BS2 will transmit data in a traffic channel with the time offset that should be used for the newly established traffic channel connection.

When data arrives at the second base station BS2 from the network RNC, it is transmitted according to the specified time offset relative to the control channel frames as shown in step S5. The new signal path will be received by the mobile station MS within a rake window of a rake receiver such as disclosed in U.S. patent application Ser. No. 07/857,433, filed Mar. 25, 1992, and now U.S. Pat. No. 5,237,586. This avoids the introduction of unnecessary interference.

When the mobile station MS moves away from the original base station BS1 with which it has had a call link and toward the new base station BS2, the offset of the traffic channel is updated on a periodic basis. At step S6, one of the call links (either from the first base station BS1 or the second base station BS2) can be disconnected, which is typically done in a call handoff.

Figure 3:
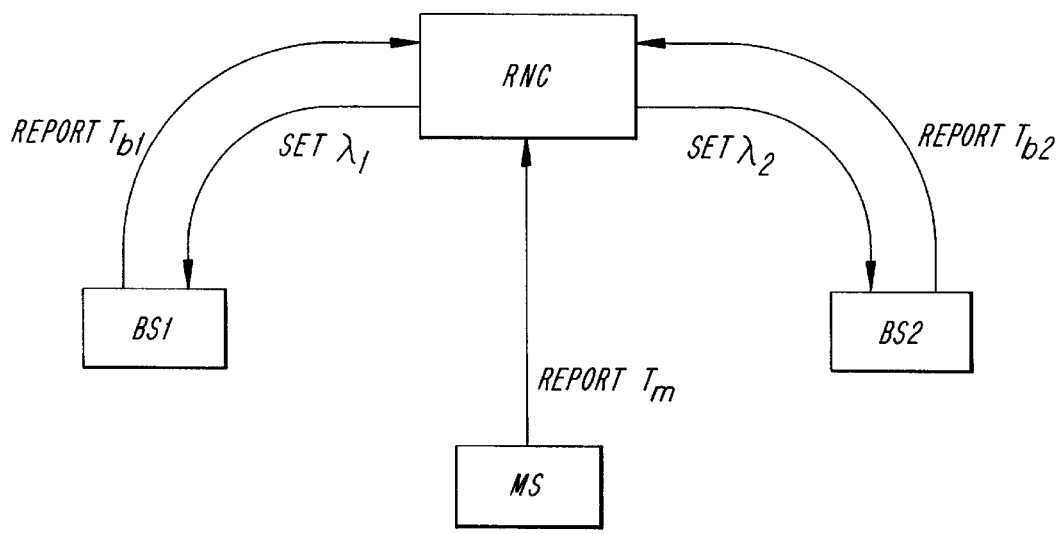
FIG. 3 shows various time delays and offsets in a cellular system in accordance with the present invention.

To explain the set-up procedure of macro-diversity synchronization in detail, the following notations are used with reference to FIGS. 2 and 3:

$T_f$=Duration of one frame, e.g. 10 ms, $T_1$=Transmission delay from radio network controller to the first base station BS1, $T_2$=Transmission delay from radio network controller to the second base station BS2, T=Maximum radio network controller-base station delay difference for two base stations, $\tau_1$=Propagation delay from the first base station BS1 to the mobile station MS, $\tau_2$=Propagation delay from the second base station BS2 to the mobile station MS, $\tau$=Maximum base station-mobile station delay difference for two base stations, $\lambda_1$=Traffic channel offset relative to a control channel CCH on the first base station BS1, $\lambda_2$=Traffic channel offset relative to a control channel CCH on the second base station BS2, $T_{b1}$=Buffering delay in first base station BS1, $T_{b2}$=Buffering delay in the second base station BS2, $T_m$=Measured offset in the mobile MS of the control channel CCH from the second base station BS2 relative to the control channel CCH from the first base station BS1.

The radio network controller RNC is assumed to send a data frame to both base stations BS1, BS2 at the same time when macro-diversity is employed. The radio network controller-base station delays $T_1$ and $T_2$ can be variable from frame to frame. The difference in delays is further assumed to be less than T (e.g., a couple of milli-seconds), i.e., $$|T_1-T_2|<T$$

Also assumed is that the propagation delay difference is bounded as $$|\tau_1-\tau_2|<\tau.$$

It is also assumed that the mobile station MS listens to the first base station BS1 on first traffic channel TCH1. The first traffic channel frames starts $\lambda_1$ after the first control channel (CCH1) frames at the first base station BS1. $\lambda_1$ is set by the radio network controller. The resulting time to buffer the frames in the first base station BS1 before transmission is then $T_{b1}$, and if $T_1$ is variable, the buffering time $T_{b1}$ will also be variable.

When the second base station BS2 is found to be strong enough for macro-diversity, the MS measures the time delay $T_m$ of the second control channel CCH2 from the second base station BS2 relative to the first control channel CCH1 of the first base station BS1. $T_m$ is reported to the radio network controller RNC.

The radio controller knows $\lambda_1$ at the first base station BS1. The $\lambda_2$ to be used as offset for the second traffic channel TCH2 relative to the second control channel CCH2 at the second base station BS2 has to be determined by the radio network controller.

When the second base station BS2 uses the $\lambda_2$ value, the resulting time to buffer the frames from the radio network controller is $T_{b2}$.

The radio network controller determine what $\lambda_2$ to use as follows. The time elaped from the moment when a frame leaves the radio network controller until it arrives at the mobile station MS must be equal for the two paths:

$$T_1+T_{b1}+\tau_1=T_2+T_{b2}+\tau_2 \tag{1}$$

The reported time delay between the control channels CCH1 and CCH2 is:

$$T_m=T_2+T_{b2}-\lambda_2+\tau_2-(T_1+T_{b1}-\lambda_1+\tau_1) \tag{2}$$

These two equations yield $$\lambda hd\ 2=\lambda_1-T_m, \tag{3}$$

which determines the offset of the second traffic channel TCH2 frames relative the second control channel CCH2 frames at the second base station BS2.

With the second traffic channel offset $\lambda_2$ from above and from equation (1), the resulting buffering time in the second base station BS2 is $$T_{b2}=T_{b1}-(T_2-T_1)-(\tau_2\tau_1). \tag{4}$$

$T_{b2}$ must be positive, since the second base station BS2 cannot transmit before it has received the frame from the radio network controller. Therefore, it is necessary that $$T_{b1}>T+\tau. \tag{5}$$

Further, $T_{b2}$ must be less than $T_f$, since otherwise the second base station BS2 would transmit the data at least one frame too early. Therefore, it is necessary that $$T_{b1}<T_f-(T+\tau). \tag{6}$$

These conditions (5) and (6) can only be satisfied if $$T+\tau<T_f/2. \tag{7}$$

Thus, the first base station BS1 needs to report the first base station buffering delay $T_{b1}$ to the radio network controller RNC, so that the radio network controller RNC can increase $\lambda_1$ if $T_{b1}$ is too low, and decrease $\lambda_1$ if $T_{b1}$ is too high. Further, the maximum delay difference T on the radio network controller-base station interface between two base stations must satisfy equation (7) above.

If $T_1$ and $T_2$ can be estimated, then timing advance can be used from the radio network controller RNC to the base stations, thus minimizing the resulting T.

When the mobile station MS is moving, $\tau hd\ 1$ and $\tau_2$ win change slowly. Based on mobile station MS reports of $T_m$, the radio network controller can update $\lambda_1$ and $\lambda_2$ continuously to maintain the synchronization of the signals at the mobile station MS. The detector time span and the delay spread of the channel will determine how often it is necessary to update the traffic channel offset values.

If a new (third) base station BS3 starts transmitting to the mobile station MS, it is necessary that equations (5) and (6) above are satisfied for at least one of the first and second base station BS1 and BS2 (exchanging $T_{b1}$ for $T_{b2}$). Thus, $T_{b1}$ or $T_{b2}$ must be monitored. If necessary, $\lambda_1$ and $\lambda_2$ has to be increased/decreased by the same amount. When the first base station BS1 stops transmitting, and only the second base station BS2 remains, there are two options. Either, T specifies the maximum delay difference between all base stations in the area where the mobile station MS moves. Then, it is not necessary that equations (5) and (6) are satisfied for $T_{b2}$ at the second base station BS2. It is enough with one base station once doing so, which will guarantee that $0<T_b<T_f$ for all other base stations. On the other hand, if T only applies to base stations that can be in macro-diversity together, then $\lambda_2$ must be adjusted so that equations (5) and (6) are satisfied for the second base station BS2 ($T_{b2}$) when the first base station BS1 is disconnected.

When the traffic channel offset $\lambda$ is increased, the base station must include a number of dummy chips between two transmitted symbols. If $\lambda$ is decreased, a number of chips has to be removed from one symbol before transmission. Thus, there is a need for a chip buffer at the transmitter. The mobile station's correlator will then find the displaced correlation peak, but the probability of symbol error will be increased for the symbol of displacement. The change of $\lambda$ should not exceed the search window size in the mobile station correlator.

Figure 5:
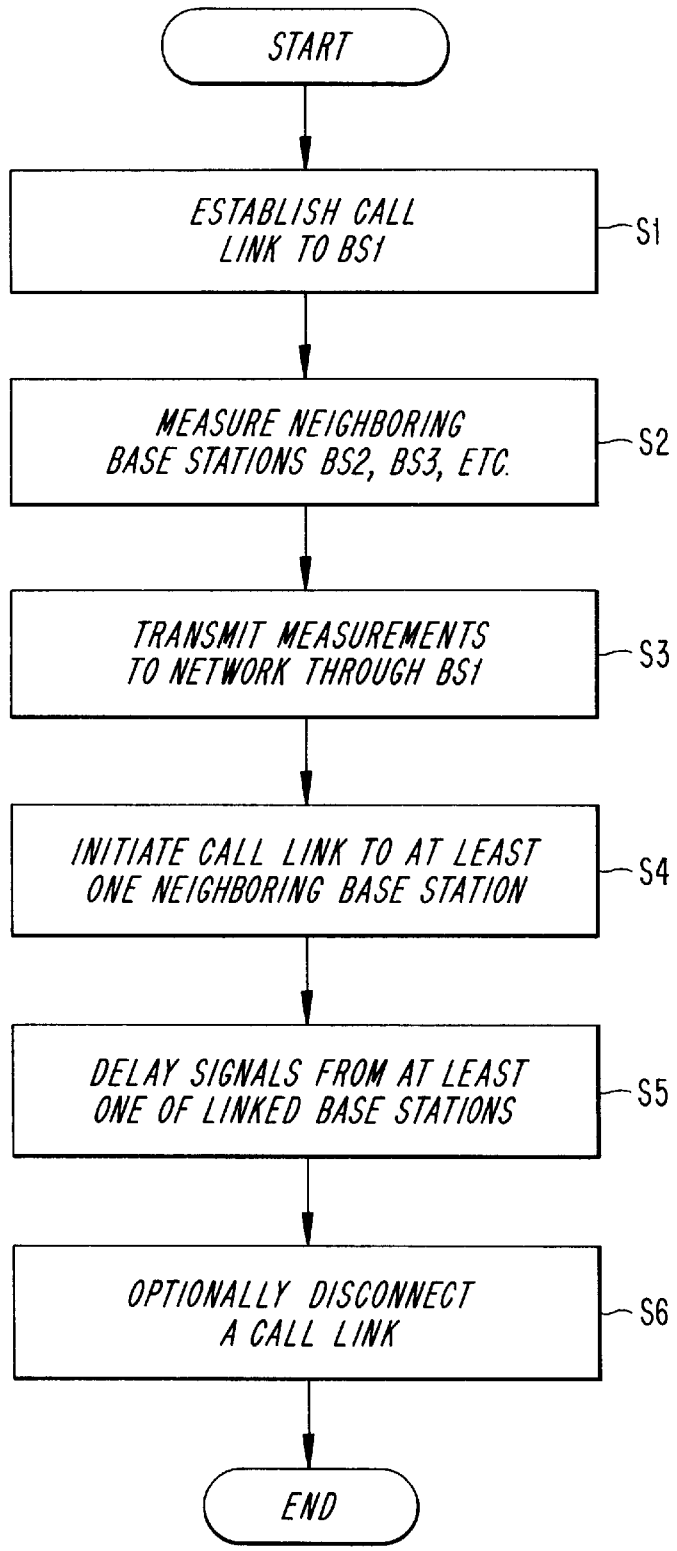
FIG. 5 illustrates the logical links for maintaining synchronization the mobile station MS.

FIG. 5 summarizes what measurements and parameters are communicated in the system to maintain synchronization of the signals at the mobile station MS.

Among the base stations transmitting to the mobile station MS, one base station BS 1, BS2 or BS3 is defined as reference base station to measure of $T_m$ in the mobile station MS. Together with pilot strength measurements of transmitting and neighboring base stations, a control channel offset $T_m$ relative the control channel CCH of the reference base station shall be reported. This means that it is not enough to correlate with the pilot codeword.

Above, it was assumed that the radio network controller-base station delay difference ($T_1-T_2$) can be bounded with T.

If the radio network controller-base station delay difference cannot be bounded (which may be the case with packet switched radio network controller-base station interface), there are cases where the two frames that should arrive in the mobile station MS actually arrive with an offset of one frame.

If the delay can be increased to the delay of the most delayed frame, two possible solutions are foreseen:

(1) The frames on the control channel CCH are numbered and the delay measurement are accompanied with the numbers (the relative offset may suffice); and (2) An initial synchronization is performed by sending out a start frame synchronously from the radio network controller and, at reception in the base stations, the control channels CCHs begin directly afterwards.

The latter requires that the base station must be re-synchronized whenever a base station is taken into operation, e.g., a new base station, a repaired base station etc.

It may be desirable to control the signals from the different base stations to arrive with a controlled delay at the mobile station MS. (This would be the case if the same codewords are used at both base stations. The delay must be larger than the delay spread of the channel, to allow identification of each base station.) The same technique as described above can be used.

If the rake detector can have a large time span, in the order of milliseconds, it can be argued that synchronization of signals at the MS is not an important issue. It seems, however, as if equations (5) and (6) need to be satisfied with an additional term representing the time difference of the signals when arriving at the MS. Thus, equations (7) still needs to be satisfied.

The present invention allows synchronization per mobile station for soft handover on one radio frequency, under certain circumstances. The radio network controller-base station delay difference must be bounded to less than half of the CDMA frame duration (a couple of milliseconds). For each mobile station a reference base station is identified. The mobile station MS needs to measure the control channel offset of all measured base stations relative the reference base station. The base stations need to report to the radio network controller RNC the buffering time before transmission in the base stations. Then, with use of the timing advance (traffic channel offset) method, the rake detector time span need not be dimensioned for propagation delays. Even if the rake detector time span can be made large easily, the constraint on delay difference on the radio network controller-base station interface still has to be considered.

Figure 6:
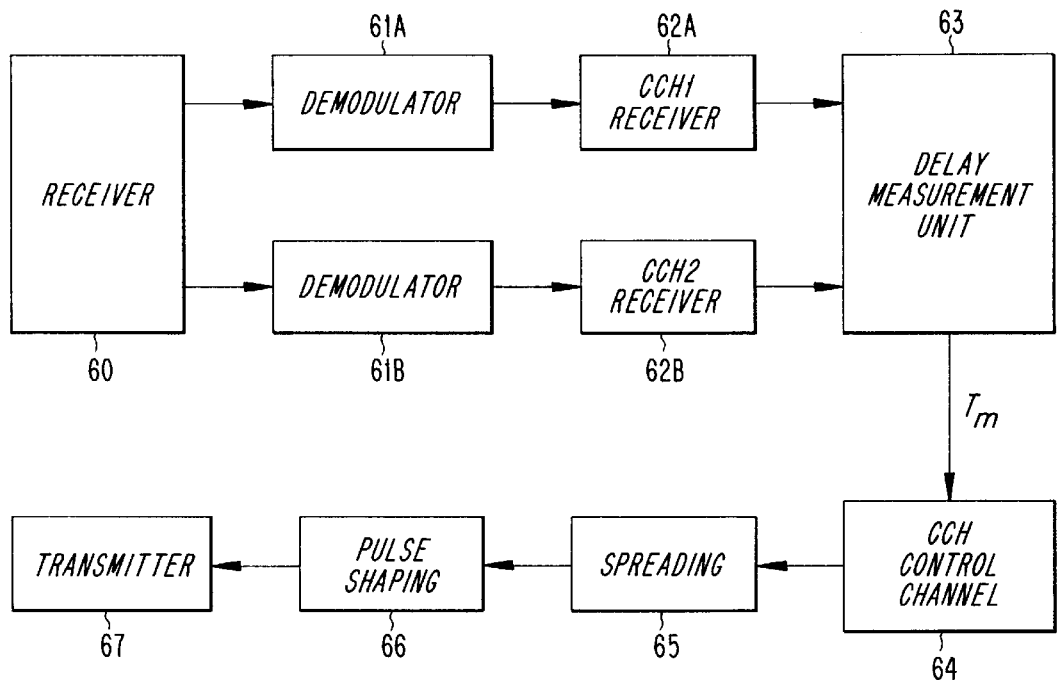
FIG. 6 is a block diagram of the relevant portion of the mobile station in accordance with the present invention.

FIG. 6 illustrates in block diagrammatic form the pertinent parts of the mobile station MS. The mobile station MS includes a receiver 60 connected to a pair of demodulators 61A and 61B for demodulating the signal received on a first channel CCH 1 and a second channel CCH 2, respectively. The demodulated signal is then fed to a pair of receivers 62A and 62B for receiving first channel and the second channel demodulated signals, respectively. After the pair of receivers 62A and 62B, the signals are fed to a delay measurement unit 63. The delay measurement unit measures the delay in accordance with the equations above to produce a control channel offset $T_m$. The control channel offset is then fed to a control channel generator 64 which generates the signal for transmission on the control channel. This signal is then fed to a spreader 65 which spreads the signal in accordance with a DS-CDMA technique. The spread signal is then fed to a pulse shaping circuit 66 for transmission by a transmitter 67.

Figure 7:
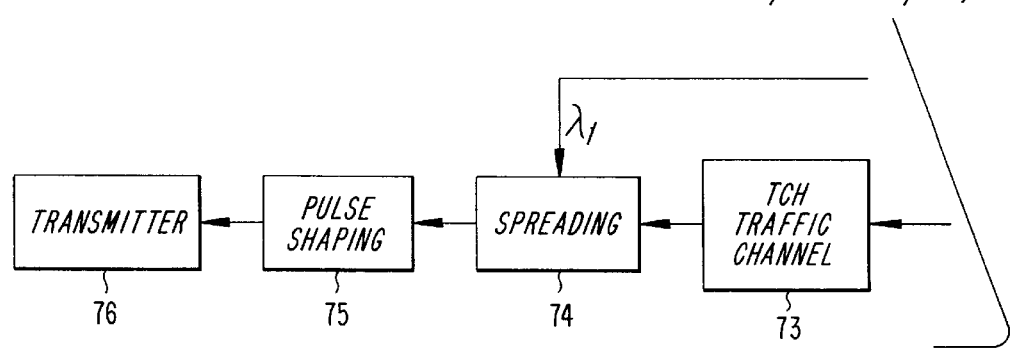
FIG. 7 is a block diagram of the relevant portion of the base station in accordance with the present invention.

FIG. 7 shows the pertinent part of a base station. The circuitry includes a receiver 70 connected to a demodulator 71 which receives, e.g., control channel signals from mobile stations MS. The demodulated signal is then fed to a channel receiver 72, the output of which is the control channel offset $T_m$ from a mobile station MS.

On the transmit side of the base station BS, a traffic channel generator 73 receives information and outputs a signal to a spreader 74. The spreader 74 superimposes a higher rate code on the information signal from the traffic channel 73 in accordance with DS-CDMA technique. However, the coded signal is delayed by the traffic channel offset $\lambda_1$, in the spreader 74 according to the above equations. The delayed signal is then sent to a pulse shaper 75 and transmitted by a transmitter 76 in a conventional fashion.

Figure 8:
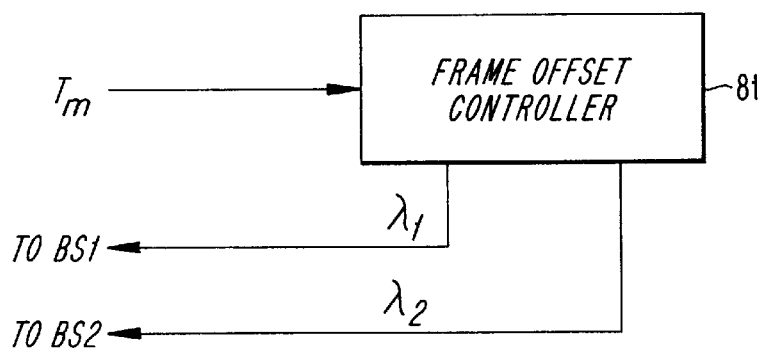
FIG. 8 is a block diagram of the relevant portion of the radio network controller in accordance with the present invention.

FIG. 8 shows the pertinent parts of a radio network control RNC. The radio network control receives a measured offset $T_m$ from the mobile stations MS of a second control channel CCH2 from a second base station BS2 relative to a first control channel CCH1 from a first base station BS1. This measured offset is input to a frame offset controller 81 which generates the traffic channel offsets $\lambda_1$ and $\lambda_2$, which are then conveyed to the first base station BS1 and the second base station BS2, respectively.

Figure 9:
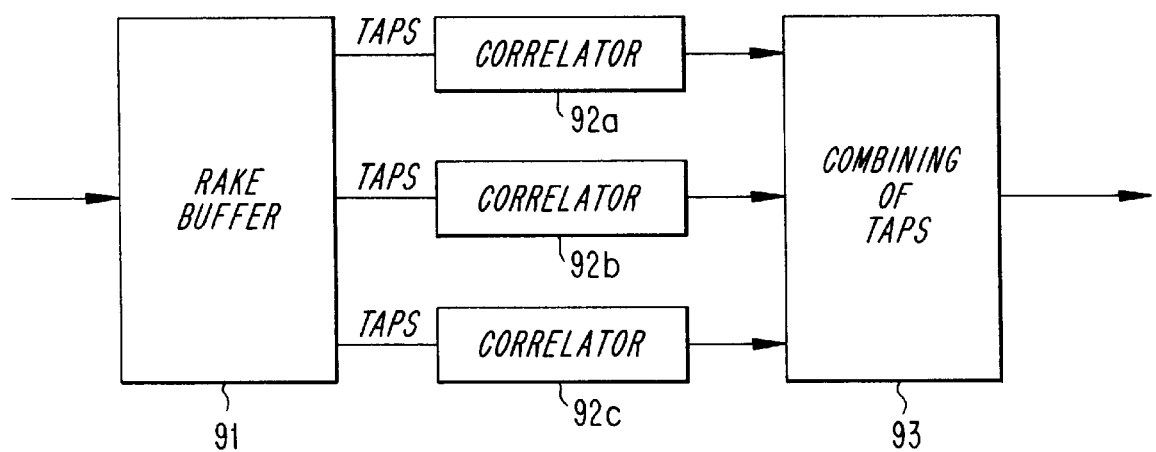
FIG. 9 is a block diagram of part of a control channel receiver including a rake receiver and correlators.

FIG. 9 shows part of a control channel receiver including a rake receiver which includes a rake buffer 91. The outputs from the rake buffer 91 are given corresponding, different time shifts relative to the input signal. The outputs are connected to three correlators 92a, 92b, and 92c. Outputs of the correlators 92a, 92b, and 92c are connected to a combining unit 93 for combining the output, and the correlated signal is output for further processing.

As an optional feature, a communication link from a base station may be transmitted in a compressed mode wherein a frame of data includes an information part and an idle part. This allows the mobile stations to measure at least one neighboring base station during an idle time slot in the compressed mode.

Figure 10A:
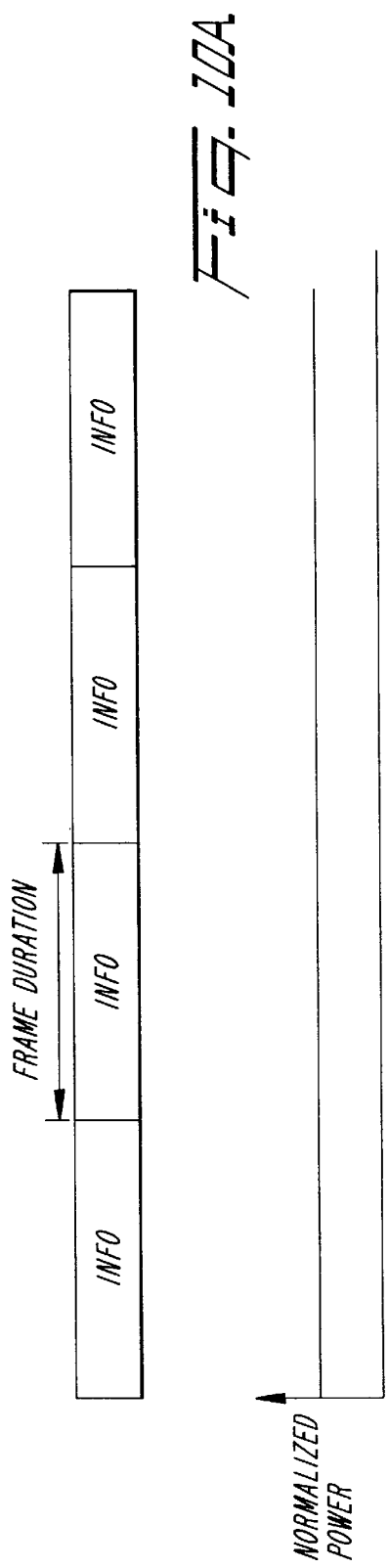
FIGS. 10A and 10B illustrate normal and compressed modes of DS-CDMA transmission.

Normally in CDMA systems information is transmitted in a structure of frames with fixed length, e.g., 5–20 ms. Information to be transmitted within a frame is coded and spread together. The maximum allowable spreading ratio is conventionally used resulting in continuous transmission during the whole frame, such as shown in FIG. 10A. Full frame transmission is denoted the normal mode transmission herein.

Figure 10B:
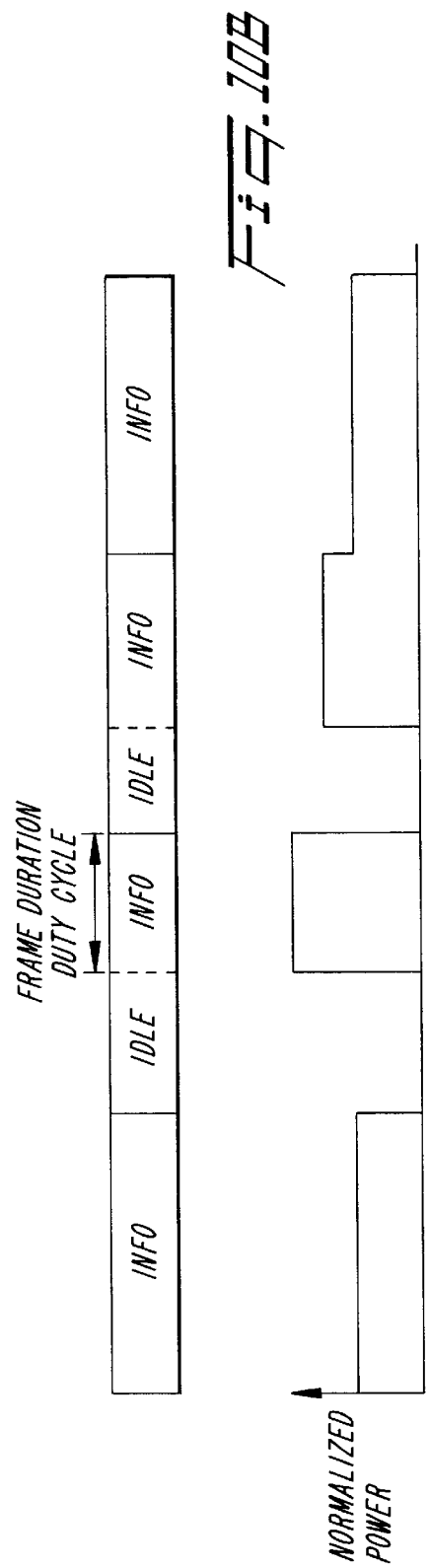

For reliable handover evaluation and execution, discontinuous transmission is used with the CDMA method. This is achieved by using a lower spreading ratio, whereby the spread information only fills an information part of a frame in the compressed mode, leaving a residual, idle part idle in which no power is transmitted, as shown in FIG. 10B.

In the method, the slotted code division multiple access communication technique impresses an informational data stream to be transmitted upon a higher rate data stream to produce a signature sequence, The signature sequence is transmitted on a channel according to a frame structure comprising frames, each frame being of a specific time duration. In contrast to previous techniques, the signature sequence is intermittently transmitted in the compressed mode wherein the frame includes an information part containing the signature sequence and an idle part wherein the signature sequence is not transmitted.

The duty cycle between the information part of the frame and the frame duration is controlled on a frame by frame basis. Thus, the compressed mode includes more than one compressed mode frame structure, each different compressed mode structure having a different duty cycle.

To control the transmission quality, the power used on the information part of the frame is a function of the duty cycle in a preferred embodiment of the present invention. Increased power is needed to maintain transmission quality if the duty cycle is reduced. During the rest of the frame, i.e., the idle part, the power is turned off.

If the mobile station MS is in macro-diversity mode, it is necessary that all connected base stations BS1, BS2, BS3, etc. employ the same transmission mode for any given frame. This synchronization can be achieved in any suitable fashion, and in a preferred embodiment is achieved through the network RNC connecting the base stations BS1 and BS2 as described above.

The evaluation of other carrier frequencies for basing handover decisions is easily preformed by using the compressed mode in the down-link from a base station to a mobile station on a deterministic basis. The evaluation of the other carrier frequencies can be carried out in any suitable fashion, such as disclosed in U.S. Pat. No. 5,175,867 to Wejke et al. Either the base station or the mobile station can perform the evaluation in the up-link or the down-link, and in the preferred embodiment the mobile station MS performs the evaluation. The mobile station MS performs measurements on other carrier frequencies during the idle part of the compressed mode frame since during this time it is not required to listen to the base station to which it is currently linked. The measurements are relayed to the network RNC (through the currently linked base station or base stations), providing the means for a mobile assisted handover (MAHO).

The compressed mode is used only intermittently at a rate determined by the network RNC. The network RNC determines the frequency of use of the compressed mode based on a variety of factors, such as the relative broadcast conditions as affected by weather and other interfering factors, and the relative call density. Most frames still use normal mode transmission in typical situations.

The variation in total transmitted power from a base station can be smoothed by staggering (spreading in time) the deployment of compressed mode over a number of users in a certain time span. Since signal strength measurement on another carrier frequency is likely to require only a fraction of a frame, the duty cycle can be made high, thereby reducing the variation in the power transmission.

Execution of a call handover is handled in the compressed mode in a preferred embodiment of the present invention. After deciding on handover to a new base station broadcasting on another carrier frequency, the compressed mode is entered. Communication with the old base station BS1 is maintained while establishing a new link during the idle part of the frame. By using the present invention for synchronization complete synchronization with the new base station BS2 is obtained, establishing a new link. The handover is completed by dropping the old link and returning to normal mode transmission. By keeping the old link after the new link is synchronized, communication to both base stations simultaneously can be employed (establishing macro-diversity on one or more carrier frequencies). This scheme for seamless inter-frequency handover can be used for both up-and down-links.

The duty cycle can be varied according to the requirements for obtaining synchronization. However, if simultaneous communication (macro-diversity) is used, a duty cycle of about 50% is preferred.

The present invention combined with use of normal and compressed mode frames provides the ability to exploit the advantages of slotted transmission/reception in hierarchical cell structures while using DS-CDMA. It is possible to measure other carrier frequencies, thereby providing reliable handover decisions. Further, handover execution between carrier frequencies can be made seamless by establishing a new link before releasing the old one. This can be done without the need for two receivers. There are other reasons other than call handover for using macro-diversity, such as maintaining a high quality communication link with a mobile station when the mobile station is traveling in an area that has high radio interference. This could be, for example, when the first base station BS1 is the base station of a microcell, whereas the second base station BS2 is a macro-cell or an umbrella cell encompassing the coverage area of the microcell. As the mobile station MS goes through the microcell, various obstacles such as buildings can interfere with the signal originating from the first base station BS1. Therefore, a redundant signal is transmitted from the macrocell BS2 to assure clear communication quality. However, the primary purpose of macro-diversity is call handover.

U.S. patent application Ser. No. 08/075,892 filed Jun. 14, 1993, abandoned for Willars et al., herein incorporated by reference, offers further details on compressed mode DS-CDMA.

While particular embodiments of the present invention have been described and illustrated, it should be understood that the invention is not limited thereto since modifications may be made by persons skilled in the art. The present application contemplates any and all modifications that fall within the spirit and scope of the underlying invention disclosed and claimed herein.

What is claimed is:

1. A method of code division multiple access for cellular communication systems, said method comprising the steps of:

broadcasting signals on communication channels;

establishing a first call link between a first base station and a mobile station;

measuring a difference in time between the reception in said mobile station of at least one signal on a common control channel of at least one neighboring base station and a signal on a common control channel from said first base station;

initiating a second call link between said at least one neighboring base station and said mobile station;

delaying transmission of at least one of a communication signal that is to be sent from said first base station and a communication signal that is to be sent from said at least one neighboring base station in accordance with said difference in time between the reception of said signals measured in said mobile station;

transmitting said communication signal that is to be sent from said first base station and said communication signal that is to be sent from said at least one neighboring base station over first and second call links, respectively; and receiving, in said mobile station, said communication signals transmitted over said first and second call links, respectively, within a predetermined time period.

2. A method according to claim 1, wherein said communication signals are transmitted according to a frame structure.

3. A method according to claim 2 comprising the further step of transmitting communication signals from said first base station in a compressed mode wherein a frame of data includes an information part and an idle part, thereby allowing said mobile station to perform said step of measuring during said idle part of a compressed mode frame.

4. A method according to claim 1, wherein said establishing step includes the step of informing said first base station about a first time offset to be applied for transmission of signals over said first call link;

and wherein said measuring step includes the steps of measuring the difference in time between reception in said mobile station of a signal on a non-time offset channel on which signals are transmitted without a time offset from said at least one neighboring base station and reception of a signal on a channel on which signals are transmitted without a time offset from said first base station with which said mobile station is currently linked;

dispatching the measured values to a network controller;

informing said at least one neighboring base station about a second time offset for transmitting signals from said at least one neighboring base station with which said second call link is to be established on an assigned channel;

and wherein said step of delaying further comprises the step of buffering at least one of said communication signals that are to be sent on said first and second call links so that the transmission of said at least one of said communication signals is offset by the respective one of said first and second time offsets.

5. A method according to claim 2, comprising the further step of transmitting signals on said communication channel of at least one neighboring base station and on a communication channel of said first base station according to a frame structure wherein said communication signals transmitted over said first and second call link respectively are transmitted in frames that are offset with a time offset relative to frames transmitted on the respective one of said communication channels of said at least one neighboring base station and of said first base station.

6. A method according to claim 4, wherein communication signals are transmitted over said second call link from at least one neighboring base station to said mobile station with an arbitrary offset relative to the transmission of signals on said non-time offset channel of said at least one neighboring base station.

7. A method according to claim 2, wherein said predetermined time period corresponds to a rake window.

8. A method according to claim 1, wherein the signal transmitted over said first call link is received in said mobile station within a first part of said predetermined time period and the signal transmitted over said second call link is received in said mobile station within a second part of said predetermined time period.

9. A method according to claim 1, wherein said at least one neighboring base station and said first base station transmit said communication signals on the same frequency.

10. A system capable of code division multiple access for cellular communication systems, said system comprising:
   at least two base stations, at least one of said base stations including means for delaying a signal in order to retain a time offset, by an offset value relative to transmission of a non-time offset signal and means for transmitting said signal delayed by said delay means and for transmitting said non-time offset signal;
   at least one mobile station including a receiver for receiving transmissions from said at least two base stations, a delay measurement unit for measuring delay in reception of said non-time offset signal from said at least one of said base stations and means for transmitting said delay measurement; and
   at least one network controller including means for receiving said delay measurements, means for generating said offset value in accordance with said delay measurements and means for transmitting said offset value to at least one of said base stations.

11. A system according to claim 10, wherein at least one of said at least two base stations includes:
   means for receiving signals including said delay measurements from said at least one mobile station; and
   means for transmitting said delay measurements to said network controller.

12. A system according to claim 10, wherein said generating means of said network controller includes means for generating an arbitrary offset value not dependent on said delay measurements.

13. A method according to claim 1, further comprising the step of transmitting said measurements to a network controller interconnecting said first base station and said at least one neighboring base station.

14. A method according to claim 8, wherein said communication signals are transmitted according to a frame structure.

15. A method according to claim, wherein said at least one neighboring base station and said first base station transmit said communication signals on different frequencies.

16. A method according to claim 14, wherein each of said first and second parts of said predetermined time period are identical to the duration of a frame respectively.

17. A method according to claim 4 further comprising the step of:
   updating at least one of said first and second time offsets in accordance with a change in said difference in reception times, said change being caused by the movements of said mobile station.

18. A method according to claim 15, wherein said predetermined time period is identical to the duration of a frame.

19. A method of code division multiple access for cellular communication systems wherein signals are transmitted according to a frame structure including signal frames, said method comprising the steps of:
   broadcasting common control signal frames containing information intended for any mobile station on common control channels of a first base station and at least one neighboring base station;
   providing a first communication link between said first base station and a mobile station;
   specifying a first time offset to be used to offset a time of transmission from said first base station to said mobile station of a first signal frame on said first communication link relative to transmission time of a first common control signal frame from said first base station on a common control channel;
   measuring a difference in time between the reception in said mobile station of a second common control signal frame transmitted on a common control channel from said at least one neighboring base station and the reception in said mobile station of one of a first signal frame and a first common control signal frame transmitted from said first base station;
   specifying at least one second time offset to be used to offset a time of transmission from said at least one neighboring base station of a second signal frame on a new communication link between said at least one neighboring base station and said mobile station relative to transmission time of a second common control signal frame on said common control channel of said at least one neighboring base station;
   initiating said new communication link between said at least one neighboring base station and said mobile station;
   delaying transmission of said second signal frame on said new communication link from said at least one neighboring base station so that said second time offset is retained;
   delaying transmission of a first signal frame on said first communication link from said first base station so that said first time offset is retained;
   transmitting said first signal frame on said first communication link from said first base station and said second signal frame on said new communication link from said at least one neighboring base station; and
   receiving said first and second signal frames in said mobile station.

20. A method according to claim 19, wherein said second time offset is set so that said first and second signal frames are received in the mobile station within a frame duration.

21. A method according to claim 20, wherein said first and said second signal frames contain identical information.

22. A method according to claim 19, wherein said mobile station performs said measurement step.

23. A method according to claim 19, wherein, in said measuring step, the difference in time is measured between the reception in said mobile station of a second common control signal frame transmitted on said common control channel from said at least one neighboring base station and the reception in said mobile station of a first common control signal frame transmitted on said common control channel from said first base station.

24. A method according to claim 19, comprising the further step of calculating, based on the result of said measuring step, said second time offset.

25. A method according to claim 19, comprising the further step of transmitting frames on said first communication link in a compressed mode, wherein information is transmitted during a first part of a compressed mode frame and information is not transmitted during a second part of said compressed mode frame; and wherein said measuring step is performed during said second part of said compressed mode frame.

26. A method according to claim 25, comprising the further step of returning to non-compressed mode transmission, wherein information is transmitted during the whole frame.

27. A method according to claim 19, wherein said first signal frame is received within a first predetermined time period and said second signal frame is received within a second predetermined time period in said mobile station, said second predetermined time period occurring in consecutive order after said first predetermined time period.

28. A method according to claim 27, wherein said first and second predetermined time period each corresponds to a rake window.

29. A method according to claim 27, wherein said first and second signal frames are transmitted in a compressed mode on said first and second call link, respectively, said first signal frame being transmitted during a first part of a compressed mode frame and said second signal frame being transmitted during a second part of said compressed mode frame.

30. A method according to claim 29, wherein said first predetermined time period corresponds to said first part of a compressed mode frame in said mobile station and said second predetermined time period corresponds to second predetermined time period in said mobile station.

31. A method according to claim 30, wherein said at least one neighboring base station and said first base station transmit on said communication links on different frequencies.

32. A method of code division multiple access for cellular communication systems wherein signals are transmitted according to a frame structure including signal frames, said method comprising the steps of:

broadcasting control signal frames containing information intended for any mobile station on a first control channel and on at least one second control channel;

providing a first communication link to a mobile station;

specifying a first time offset to be used to offset a time of transmission of first signal frames on said first communication link relative to transmission of first control signal frames on said first control channel;

measuring a difference in time between the reception in said mobile station of a second control signal frame transmitted on said at least one second control channel and the reception in said mobile station of a first control signal frame transmitted on said first control channel;

specifying at least one second time offset to be used to offset a time of transmission of second signal frames on a new communication link to said mobile station relative to transmission time of second control signal frames on said second control channel;

initiating said new communication link to said mobile station;

delaying transmission of a second signal frame on said new communication link so that said second time offset is retained;

delaying transmission of a first signal frame on said first communication link so that said first time offset is retained;

transmitting said first signal frame on said first communication link and said second signal frame on said new communication link; and receiving said first and second signal frames in said mobile station.

33. The method of code division multiple access according to claim 32, comprising the further step of periodically updating at least one of said first time offset and said second time offset.

* * * * *